(12) United States Patent
Chung et al.

(10) Patent No.: US 11,193,698 B1
(45) Date of Patent: Dec. 7, 2021

(54) WASTE HEAT RE-CYCLE COOLING SYSTEM

(71) Applicant: Quattro Dynamics Company Limited, Hong Kong (HK)

(72) Inventors: Ming Yau Chung, Hong Kong (HK); Ken Wong, Hong Kong (HK); Ka Lok Chan, Hong Kong (HK); Chi Cheung Andrew Chan, Hong Kong (HK)

( * ) Notice: Subject to any disclaimer, the term of this patent is extended or adjusted under 35 U.S.C. 154(b) by 0 days.

(21) Appl. No.: 15/930,436

(22) Filed: May 13, 2020

(51) Int. Cl.
*F25B 21/04* (2006.01)

(52) U.S. Cl.
CPC ...... *F25B 21/04* (2013.01); *F25B 2321/0251* (2013.01); *F25B 2321/0252* (2013.01)

(58) Field of Classification Search
CPC .......... F25B 21/02; F25B 21/04; F25B 11/00; F25B 11/02; F25B 2321/0251; F25B 2321/0252; F25B 2321/02; F25B 2321/021; F25B 2321/0212; F25B 2315/002
See application file for complete search history.

(56) References Cited

U.S. PATENT DOCUMENTS

| | | | | | |
|---|---|---|---|---|---|
| 8,925,318 | B2 * | 1/2015 | Seo | ........................ | F01K 23/065 60/618 |
| 10,435,604 | B2 * | 10/2019 | Kontomaris | .............. | F01K 7/32 |
| 10,975,279 | B2 * | 4/2021 | Kontomaris | ........... | C09K 5/045 |
| 2006/0225441 | A1 * | 10/2006 | Goenka | .............. | B60H 1/00478 62/115 |
| 2010/0287952 | A1 * | 11/2010 | Goenka | .................... | F25B 21/04 62/3.1 |
| 2012/0085105 | A1 * | 4/2012 | Quisenberry | ........... | F25B 21/02 62/3.2 |
| 2015/0192332 | A1 * | 7/2015 | Hojer | ...................... | F25B 21/04 62/3.3 |
| 2016/0229260 | A1 * | 8/2016 | Park | ........................ | F25B 21/02 |
| 2017/0110775 | A1 * | 4/2017 | Smith | ................. | H01M 10/625 |
| 2017/0306205 | A1 * | 10/2017 | Kontomaris | .............. | F01K 7/32 |
| 2018/0259204 | A1 * | 9/2018 | Jeon | ........................ | F24F 13/20 |
| 2018/0347871 | A1 * | 12/2018 | Park | ........................ | F25B 21/04 |
| 2019/0003393 | A1 * | 1/2019 | Dierksmeier | ........... | H01L 35/28 |
| 2019/0331425 | A1 * | 10/2019 | Hatasako | ................. | H01L 35/30 |
| 2019/0376739 | A1 * | 12/2019 | Behringer | ............. | F25D 31/007 |
| 2020/0132344 | A1 * | 4/2020 | Seki | ..................... | H01L 21/6833 |
| 2020/0208886 | A1 * | 7/2020 | Adelmann | ............... | F25B 21/02 |
| 2020/0355413 | A1 * | 11/2020 | Monteith | .................. | F25B 9/08 |
| 2021/0180838 | A1 * | 6/2021 | Eastman | ................. | F25B 49/00 |

* cited by examiner

*Primary Examiner* — Jianying C Atkisson
*Assistant Examiner* — Miguel A Diaz
(74) *Attorney, Agent, or Firm* — W&K IP

(57) ABSTRACT

The invention is about a waste heat re-cycle cooling system, has a Peltier device, a waste heat recycling circuit, and a processor. The Peltier device has a cold side close to room and a hot side, the cold side is connected to a cooling pipe, and a fan arranged on one side of the cooling pipe is configured to blow air over the cooling pipe to cool down air and then blow the cooling air into room. The processor is configured to control the Peltier device and the waste heat recycling circuit. The invention can effectively utilize the waste heat generated by cooling and improve the cooling efficiency.

8 Claims, 2 Drawing Sheets

WASTE HEAT RE-CYCLE COOLING SYSTEM

TECHNICAL FIELD

The invention belongs to the field of cooling equipment, in particular to a waste heat re-cycle cooling system.

BACKGROUND

Cooling equipment is an essential device for controlling environmental conditions in our modern society, and it can be found everywhere in homes, industrial sites, transportation, storage and other environments. Especially in the tropical regions of the world, the use of cooling equipment such as air conditioners and refrigerators has become more and more common. Energy that uses air conditioners and refrigerators to keep cool accounts for about one-fifth of global building electricity consumption and 10% of total global electricity consumption today. The cooling equipment uses electrical energy to exchange the heat in the environment from the internal area to the external area, thereby achieving the effect of cooling.

In the existing cooling equipment, both include a cold side and a hot side. The cold side includes an evaporator and a fan. The fan blows air over the chilled coil, and the cooled wind is blown into the room through the fan. The hot side includes a compressor, a condenser, and another fan to vent hot air coming off the compressed refrigerant to the exterior.

However, the existing cooling system has some side effects which are harmful to the environment, for example: during operation, the waste heat generated by the system will be discharged to the outside and may be harmful to the outdoor environment; the refrigerant discharged or leaked by the compressor may damage the ozone layer of the atmosphere or increase Greenhouse effect.

SUMMARY

It is an object of the present invention to provide a waste heat re-cycle cooling system to solve or alleviate one or more technical problems in the prior art.

As an aspect of the embodiments of the present invention, which provides a waste heat re-cycle cooling system, comprising: a Peltier device, a waste heat recycling circuit and a processor. The Peltier device comprises a cold side close to room and a hot side, wherein the cold side is connected to a cooling pipe, and a fan arranged on one side of the cooling pipe is configured to blow air over the cooling pipe to cool down air and then blow the cooling air into room. The waste heat recycling circuit comprises a fluid tank, a boiler, a turbine, a generator, and a condenser, wherein the fluid tank, the boiler, the turbine, and the condenser are sequentially connected by tubes to form a closed circuit; the fluid tank is configure to store the fluid returning from the condenser; the boiler is attached to the hot side and configured to heat the fluid flowing into the boiler from the tank with the heat of the hot side to generate steam, and the steam is configured to drive the turbine to rotate to drive the generator to generate electricity; the condenser is configured to condense the steam that escapes from the turbine into the condenser into a liquid, which will return to the fluid tank. The processor is configured to control the Peltier device and the waste heat recycling circuit.

In some embodiments, the waste heat recycling circuit further comprises valves provided in at least one of the followings: between the fluid tank and the boiler, between the boiler and the turbine, between the turbine and the condenser, between the condenser and the fluid tank; and the processor is connected to the control end of the valve and is configured to control the valves to turn on or turn off.

In some embodiments, the system further comprises pressure sensors provided inside the boiler and in the output of the turbine, and a first valve provided between the boiler and the turbine; the pressure sensors are configured to detect the pressure inside the boiler and the pressure at the output of the turbine, and send the detected pressure to the processor; and the processor is configured to calculate the difference between the pressure inside the boiler and at the output of the turbine, and switch the first valve to release the steam to drive the turbine when the difference is equal to or greater than the minimum value of the pressure that can drive the turbine.

In some embodiments, the system further comprises liquid level sensors connected to the processor and respectively arranged in the fluid tank, the condenser, and the boiler, a second valve arranged at the outlet of the condenser, and a third valve arranged between the fluid tank and the boiler; the processor is configured to determine whether the level of the fluid tank is within a safe level range and control the system under the determination; the processor is configured to determine whether the level of the condenser reaches a set level threshold, and if the level of the condenser reaches the level threshold, switch the second valve to allow fluid flow out from the condenser and return to the fluid tank; and the processor is configured to determine whether the level of the boiler is lower than a set level threshold, and if the level of the boiler is lower than this level threshold, switch the third valve to allow fluid flow out from the fluid tank and flow into the boiler.

In some embodiments, the system further comprises a pump arranged between the fluid tank and the boiler, and the processor is connected to the control end of the pump and configured to switch the pump to pump fluid from the fluid tank into the boiler when the third valve is switched.

In some embodiments, the system further comprises temperature sensors connected to the processor and provided in the boiler, the condenser, the cold side and the hot side, respectively, and the processor is configured to control the temperature of the boiler, the condenser, the cold side and the hot side to reach a safe temperature range to ensure the normal operation of the system.

In some embodiments, the processor is further configured to control the wind speed of the fan to adjust the flow rate of the airflow over the cooling pipe.

In some embodiments, the waste heat recycling circuit further comprises an energy storage connected to the current output end of the generator for storing electric energy generated by the generator.

In some embodiments, the waste heat recycling circuit further comprises a power regulator arranged between the current output end of the generator and the energy storage for regulating the power of the current output to the energy storage; and the power regulator is also configured to connect with external power supply and regulate the power of the current output to the system.

In some embodiments, the system further comprising an enclosure for containing the waste heat recycling circuit.

The embodiments of the present invention have an environmentally friendly cooling system powered by electricity. The system has Peltier device(s) without using compressor to cool down the environment, and the heat energy generated by the Peltier device(s) is transferred to the heat-absorbing fluid through the boiler, so that the fluid can be evaporated to generate steam. Then, the steam enters the turbine to drive it to rotate to drive the generator to generate electricity. Thus, the waste heat generated in the system is used to generate electricity to recycle electrical energy. In this way, waste heat is no longer emitted into environment, reducing the side effect for environment and improving the efficiency of cooling.

Compared with the existing air conditioner, the system of the embodiment of the present invention does not require a compressor for cooling, but uses a Peltier device(s) for cooling. Moreover, by changing the number of the Peltier device which is the key component of the cooling system, larger cooling power can be obtained, with lower cost, higher efficiency, and longer service life.

The above summary is for the purpose of description only and is not intended to be limiting in any way. In addition to the schematic aspects, embodiments, and features described above, further aspects, embodiments, and features of the invention will be readily apparent by reference to the drawings and the following detailed description.

BRIEF DESCRIPTION OF THE DRAWINGS

In the drawings, unless otherwise specified, the same reference numerals refer to the same or similar parts or elements throughout the multiple drawings. These drawings are not necessarily drawn to scale. It should be understood that these drawings only depict some embodiments disclosed according to the present invention and should not be considered as limiting the scope of the present invention.

DETAILED DESCRIPTION OF EMBODIMENTS

In the following, only certain exemplary embodiments are simply described. As those skilled in the art will recognize, the described embodiments may be modified in various different ways without departing from the spirit or scope of the present invention. Therefore, the drawings and descriptions are considered to be exemplary in nature and not restrictive.

Figure 1:
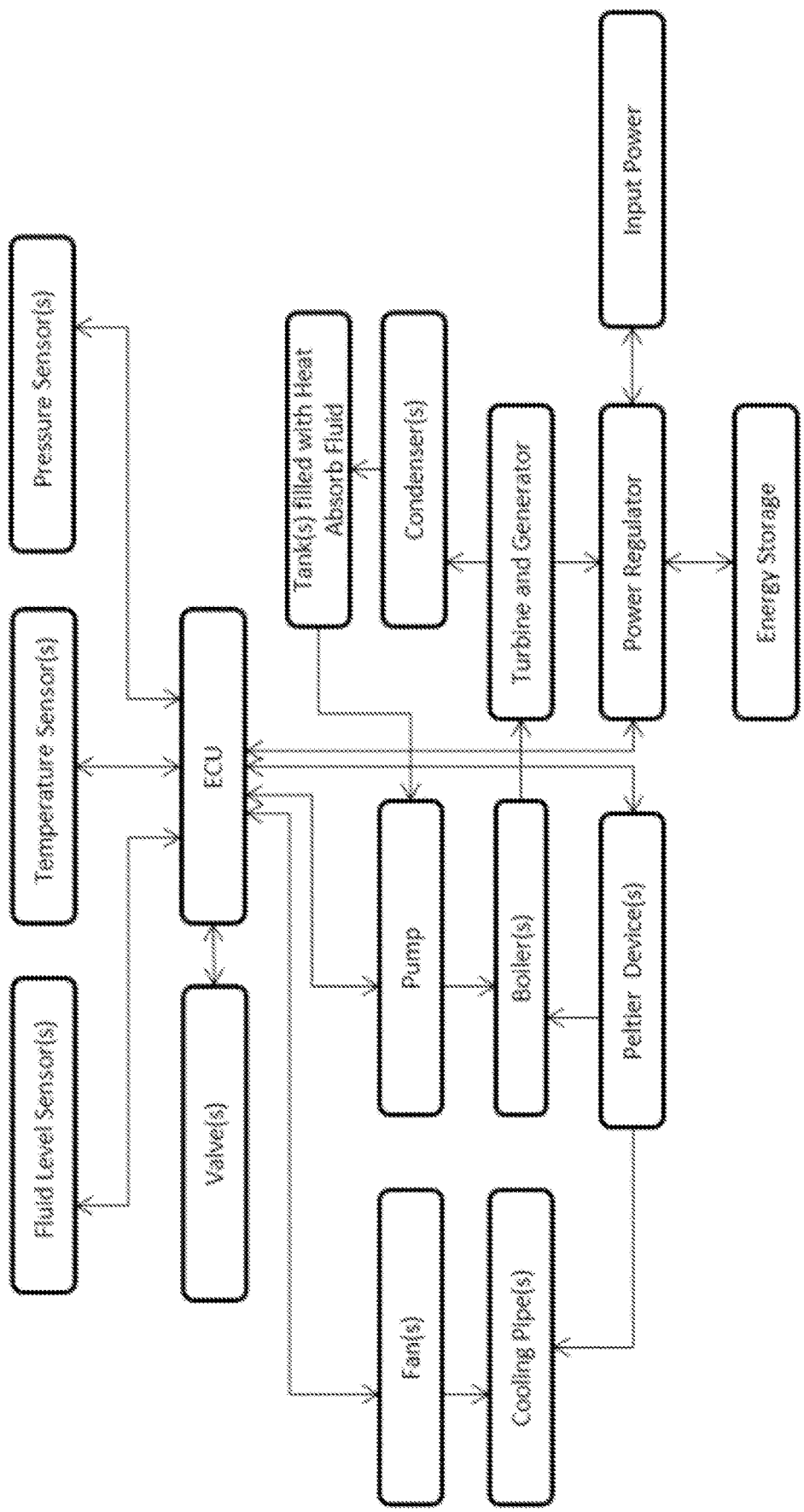
FIG. 1 shows a control block diagram of a waste heat re-cycle cooling system according to an embodiment of the present invention.
Figure 2:
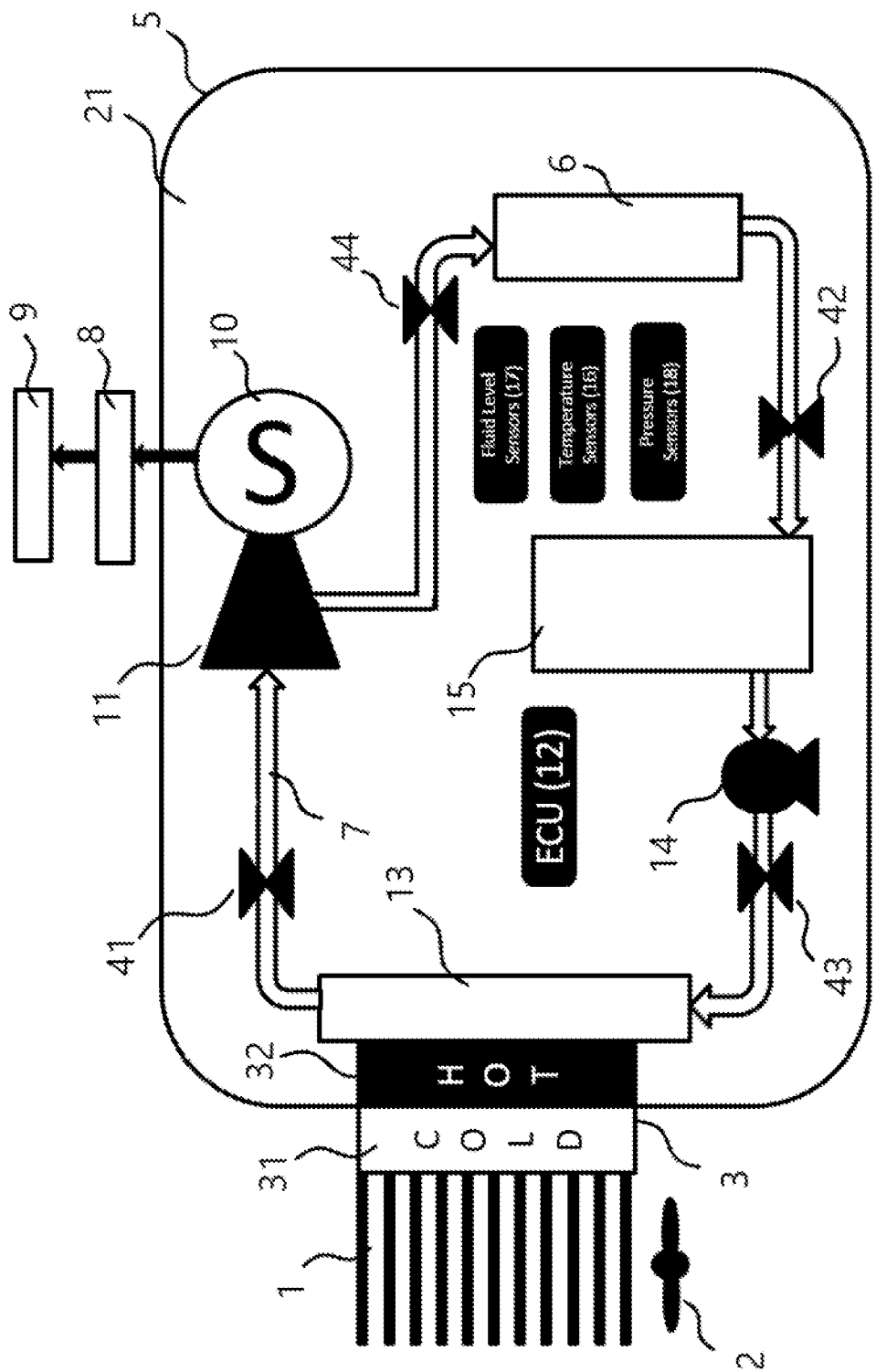
FIG. 2 shows a structural diagram of a waste heat re-cycle cooling system according to an embodiment of the present invention.

As an exemplary embodiment, FIG. 1 shows a control block diagram of a waste heat re-cycle cooling system according to an embodiment of the present invention. FIG. 2 shows a structural diagram of waste heat circulation cooling according to an embodiment of the present invention. The waste heat re-cycle cooling system of the embodiment of the present invention may be applied to devices such as refrigerators, air conditioners, and vehicle air conditioners, and may even be applied to portable cooling fans.

As shown in FIG. 2, the waste heat re-cycle cooling system may include: a Peltier device 3, a waste heat recycling circuit 21, and a processor 12 (Electronic Control Unit, ECU 12) for controlling the Peltier device 3 and the waste heat recycling circuit 21. The Peltier device 3 includes a cold side 31 close to room and a hot side 32. The cold side 31 is connected to the cooling pipe 1. The processor 12 can turn on or turn off power switch to power the Peltier device 3. When the Peltier device 3 works, the Peltier device 3 generates a hot side 32 and a cold side 31 because of thermoelectric effect. The heat generated by the hot side 32 of the Peltier device 3 is equal to the sum of power consumption of the Peltier device 3 and cooling produced on the cold side 31 of the Peltier. P is the power consumption of the Peltier device 3, $Q_h$ is the heat generated by the hot side 32, and $Q_c$ is the cooling produced on the cold side 31. The units of all three are watts. In this way, the heat generated by the hot side $32 Q_h = P + Q_c$. Recycling such a large amount of heat can effectively improve the efficiency of cooling.

For the cold side 31, the cold side 31 is in contact with the cooling pipe 1. When the cold side 31 is cold, the temperature of the cooling pipe 1 is also reduced accordingly. A fan 2 is arranged on one side of the cooling pipe 1. It also can be arranged several fans 2. The fan 2 blows the air over the cooling pipe 1 to cool, and the cooled air is blown into room, which lowers the indoor ambient temperature and achieves the cooling efficiency.

For the hot side 32, the waste heat recycling circuit 21 may comprise a fluid tank 15, a boiler 13, a turbine 11, a generator 10, a condenser 6, and so on. The fluid tank 15, boiler 13, turbine 11, and condenser 6 are connected in sequence by tubes 7 to form a closed circuit. The boiler 13 is in contact with the hot side 32 of the Peltier device 3. The material in the tube 7 circulating in the tube 7 line comes in two forms: fluid and steam. The fluid is a liquid that can absorb heat, for example, a fluid with a boiling point lower than 100° C. It can be used as a medium for the heat exchange process. The fluid tank 15 stores fluid returning from the condenser 6. When the fluid in the boiler 13 is reduced, part of the fluid in the tank can flow into the boiler 13. The boiler 13 uses the heat generated by the hot side 32 to heat the fluid flowing into the boiler 13 to generate steam. The air pressure inside the boiler 13 gradually increases, and steam can escape from the boiler 13 and enter the turbine 11 through the tube 7, driving the turbine 11 to rotate to drive the generator 10 to generate electricity. The electrical energy generated by the generator 10 can power Peltier devices 3, processors 12 and other components in the system. And then the steam escapes from the turbine 11 and enters the condenser 6 through the tube 7. The condenser 6 condenses the steam into liquid. When the liquid in the condenser 6 is full, it will return to the storage tank.

In order to improve work efficiency, there can be multiple Peltier devices 3, waste heat recycling circuits 21, and various components in the circuits in the system.

The waste heat recycling circuit 21 can be provided with multiple valves to control the flow of fluid or steam in the circuit.

For example, a first valve 41 is arranged in the tube 7 between the boiler 13 and the turbine 11, the outlet of the boiler 13, or the inlet of the turbine 11. A second valve 42 is arranged in the tube 7 between the condenser 6 and the fluid tank 15, the outlet of the condenser 6, or the inlet of the fluid tank 15. A third valve 43 is arranged in the tube 7 between the fluid tank 15 and the boiler 13, the outlet of the fluid tank 15, or the inlet of the boiler 13. A fourth valve 44 is provided in the pipe between the turbine 11 and the condenser 6, the outlet of the turbine 11 or the inlet of the condenser 6.

Multiple pressure sensors 18, temperature sensors 16, and liquid level sensors 17 can be arranged in the system. The processor 12 is connected to these sensors and controls the heat exchange process of the system based on the feedback of the sensors.

Pressure sensors 18 can be arranged inside the boiler 13 and at the outlet of the turbine 11, respectively. The processor 12 can know the pressure of the boiler 13 by the pressure sensor 18 in the boiler 13 and the pressure of the outlet of the turbine 11 by the pressure sensor 18 of the turbine 11, and then calculate the difference between the two. Once the pressure difference between the two is equal to or less than the minimum pressure driving the turbine 11, the processor 12 switches the first valve 41 and releases steam to drive the turbine 11 to rotate. The turbine 11 then drives the generator 10 to generate electricity. After driving the turbine 11 and generator 10, most of the evaporated absorb heat fluid returns to its liquid form. The fluid then flows into the condenser 6 through one or more tube 7s.

The pressure sensor 18 may be arranged on the surface of the cooling pipe 1. The processor 12 detects the wind pressure on the cool side by the pressure sensor 18 of the cooling pipe 1, and then controls the wind speed of the fan 2, and thus controls the flow rate of air passing over the cooling pipe 1.

The liquid level sensor 17 can be arranged in the fluid tank 15, condenser 6 and boiler 13.

The processor 12 can detect the liquid level of the fluid tank 15 by the liquid level sensor 17 of the fluid tank 15. If the liquid level of the fluid tank 15 is not within the safe range, the processor 12 can turn on or turn off the valve(s) in the system to adjust the liquid level of the fluid tank 15. For example, if the liquid level in the tank is too high, the second valve 42 can be turned off and the third valve 43 can be turned on, so that the fluid in the fluid tank 15 can flow into the boiler 13, and the fluid in the condenser 6 is prevented from flowing back into the fluid tank 15. If the liquid level in the tank is too low, the second valve 42 can be turned on and the third valve 43 can be turned off, so that the fluid in the condenser 6 can return to the fluid tank 15, and the fluid in the fluid tank 15 is prevented from flowing into the boiler 13.

The processor 12 can detect the liquid level of the condenser 6 by the liquid level sensor 17 in the condenser 6. If the liquid level of the condenser 6 reaches the liquid level threshold, the processor 12 switches the second valve 42 to allow fluid to flow out of the condenser 6 and back into the storage tank. Wherein, the outlet of the condenser 6 can be set at a certain height of the condenser 6. When the liquid level of the condenser 6 reaches the outlet, the second valve 42 arranged in this outlet can be switched by itself, and the fluid can return to the fluid tank 15.

The processor 12 can detect the liquid level of the boiler 13 by the liquid level sensor 17 of the boiler 13. The fluid in the boiler 13 will gradually decrease with heating and evaporation. When its liquid level is lower than the set level, the processor 12 switches the third valve 43, and the fluid flows out of the fluid tank 15 and flows into the boiler 13. In some embodiments, a pump 14 may be arranged in the tube 7 between the fluid tank 15 and the boiler 13. The processor 12 can control the pump 14 to turn on and off, which can be powered by a generator 10, energy storage 9, or external power supply. When the third valve 43 is turned on, the processor 12 can simultaneously turn on the pump 14 so that the fluid in the tank 15 can be quickly pumped into the boiler 13. If the fluid level in the tank 15 is higher than the set level, the processor 12 can stop the pump 14 and turn off the third valve 43.

Temperature sensors 16 may be arranged with on the boiler 13, the condenser 6, the cold side 31 and the hot side 32. The processors 12 can detect the temperatures of the boiler 13, the condenser 6, the cold side 31 and the hot side 32 by these temperature sensors to control their temperature fall within the safe temperature range to ensure the normal operation of the system.

The waste heat recycling circuit 21 may also include an energy storage 9 or several energy storages 9 connected to the current output end of the generator 10 for storing electrical energy generated by the generator 10. Energy storage (s) 9 can output current to power Peltier devices 3, pumps 14, and processors 12. The electrical energy generated by the generator 10 can be directly supplied by the system in addition to being stored in the energy storage 9.

The waste heat recycling circuit 21 may also comprise a power regulator 8. The power regulator 8 can be arranged with multiple power input terminals, which are respectively connected to the power output terminals of the generator 10, external power supply, energy storage 9, etc. The power regulator 8 is arranged with multiple power output terminals, which are respectively connected to the power input terminals of the energy storage 9, Peltier device 3, Pump 14, processor 12, etc. The power regulator 8 can regulate the power of the current input into it, and then power various components in the system.

The waste heat re-cycle cooling system may also have an enclosure 5. In addition, the enclosure 5 closes the waste heat recycling circuit 21, which can prevent the heat from leaking to the outside of the enclosure 5 during the cooling process.

In the embodiments of the present invention, the waste heat re-cycle cooling (WHRC) system can internally convert thermal energy into useful energy for consumption and/or storage, otherwise it will be wasted and dumped into an environment that may cause global warming. When the captured heat energy is converted into useful work, part of the waste heat energy can be recovered to improve the efficiency of cooling.

The Peltier device 3 is now part of the WHRC system, instead of using a compressor inside the traditional air conditioning cooling system, which reduces the life of the traditional cooling system with a compressor. Another benefit of the WHRC system is that because the cooling capacity can be multiplied by the number of fluid circuits, the WHRC system can meet different cooling needs. Therefore, the embodiments of the present invention will be applied to various applications, such as home air conditioners, refrigerators, commercial heating, ventilation and air conditioning (HVAC), industrial refrigerators, and etc. Extra benefit of the WHRC system is the cost saving from energy from its operation because it captures the waste heat to regenerate into electrical energy, which is stored in its energy storage and/or its own consumption.

The embodiments of the present invention have the following beneficial effects:

1. This cooling system has Peltier device(s) without using compressor which provides thermoelectric effect to cool down the environment when the fan(s) blows air passing the cooling pipe(s) contacted with the cold side of the Peltier device(s) when the Peltier device(s) powered up. And the hot side of the device(s) contacted with the boiler, boils the heat absorb fluid inside it.

2. This cooling system consists of heat absorb fluid with boiling point below 100° C. which is used to circulate as a medium for the heat exchange process by utilizing phase changes within the cooling system. The fluid absorbs the thermal energy from the hot sides and vaporizes into steam. The steam then enters into turbine and generator for generating electricity, which will be consumed by the system and/or stored in batteries. Next, the vapor enters the condenser 6 and turn back into fluid which will flow into the tank. And the fluid in the tank will by pumped into the boiler for cycling. This cooling system enables to retreat the waste heat to generate energy during its cooling process.

3. This cooling system has turbine and generator installed, which re-cycle the thermal energy from the heat absorb fluid in vapor state and convert to electrical energy. This enables the heat recycling process within the cooling system. There will be no waste heat from the system.

4. Electronic Control Unit (ECU) or processor in the system is to control the valves and pumps with signals from fluid level, temperature and pressure sensors, which makes and monitors the fluid flow for the heat exchange process, Peltier device(s) and power regulator. It can prevent fluid leakage, over pressure and over heat situations for safety protection.

5. Based on thermoelectric effect, heat produced on hot side of Peltier device in Watt ($Q_h$) is equal to the sum of power consumption of Peltier device in Watt (P) and cooling produced on cold side 31 of Peltier device 3 in Watt ($Q_c$)·$Q_h$=P+$Q_c$. This cooling system can perform energy re-generation process by capturing $Q_h$ during operation. Therefore, the heat does not leak out to the exterior area. This enables to eliminate anthropogenic heating of the environment.

In the description of this specification, it should be understood that the terms "center", "longitudinal", "transverse", "length", "width", "thickness", "upper", "lower", "front", "Rear", "Left", "Right", "Vertical", "Horizontal", "Top", "Bottom", "Inner", "Outer", "Clockwise", "Counterclockwise", "Axial", "Radial", "circumferential", etc. indicate the azimuth or positional relationship is based on the azimuth or positional relationship shown in the drawings, only to facilitate the description of the present invention and simplify the description, not to indicate or imply the device Components must have a specific orientation, be constructed and operated in a specific orientation, and therefore cannot be construed as limiting the invention.

In addition, the terms "first" and "second" are used for description purposes only, and cannot be understood as indicating or implying relative importance or implicitly indicating the number of technical features indicated. Thus, the features defined as "first" and "second" may explicitly or implicitly include one or more of the features. In the description of the present invention, the meaning of "plurality" is two or more, unless otherwise specifically limited.

In the present invention, unless otherwise clearly specified and defined, the terms "installation", "connection", "connection", "fixation" and other terms should be understood in a broad sense, for example, it may be a fixed connection or a detachable connection, Or integrated; it can be mechanical connection, electrical connection, or communication; it can be directly connected or indirectly connected through an intermediary, it can be the connection between two components or the interaction between the two components. Those of ordinary skill in the art can understand the specific meanings of the above terms in the present invention according to specific situations.

In the present invention, unless otherwise clearly specified and defined, the first feature "above" or "below" the second feature may include the first and second features in direct contact, or may include the first and second features Contact not directly but through other features between them. Moreover, the first feature is "above", "above" and "above" the second feature includes that the first feature is directly above and obliquely above the second feature, or simply means that the first feature is higher in level than the second feature. The first feature is "below", "below" and "below" the second feature includes that the first feature is directly above and obliquely above the second feature, or simply means that the first feature is less horizontal than the second feature.

The above disclosure provides many different embodiments or examples for implementing different structures of the present invention. In order to simplify the disclosure of the present invention, the components and settings of specific examples are described above. Of course, they are only examples, and the purpose is not to limit the invention. In addition, the present invention may repeat reference numerals and/or reference letters in different examples. Such repetition is for the purpose of simplicity and clarity, and does not itself indicate the relationship between the various embodiments and/or settings discussed.

The above is only the specific implementation of the present invention, but the scope of protection of the present invention is not limited to this, any person skilled in the art can easily think of various changes or within the technical scope disclosed by the present invention. Instead, these should be covered by the protection scope of the present invention. Therefore, the protection scope of the present invention shall be subject to the protection scope of the claims.

What is claimed is:

1. A waste heat re-cycle cooling system, comprising:
a Peltier device, which comprises a cold side next to a room and a hot side, wherein the cold side is connected to a cooling pipe, and a fan arranged on one side of the cooling pipe is configured to blow air over the cooling pipe to cool down air and then blow the cooling air into the room;
a waste heat recycling circuit, which comprises a fluid tank, a boiler, a turbine, a generator, and a condenser, wherein the fluid tank, the boiler, the turbine, and the condenser are sequentially connected by tubes to form a closed circuit; the fluid tank is configured to store the fluid returning from the condenser; the boiler is attached to the hot side and configured to heat a fluid flowing into the boiler from the tank with the heat of the hot side to generate steam, and the steam is configured to rotate the turbine to drive the generator to generate electricity; the condenser is configured to condense the steam flowing from the turbine into a liquid, wherein the liquid returns to the fluid tank;
a processor, which is configured to control the Peltier device and the waste heat recycling circuit;
wherein the waste heat recycling circuit further comprises at least one of the following: a first valve between the boiler and the turbine, a second valve between the condenser and the fluid tank, a third valve between the fluid tank and the boiler, and a fourth valve between the turbine and the condenser; and the processor is connected to a control end of each of the valves and is configured to control the valves to turn on or turn off;
the system further comprises at least two pressure sensors, wherein the at least two pressure sensors are provided inside the boiler and in the output of the turbine respectively; the pressure sensor is configured to detect the pressure inside the boiler and the pressure at the output of the turbine, and send it to the processor; and the processor is configured to calculate the difference between the pressure inside the boiler and at the output of the turbine, and switch the first valve to release the steam to drive the turbine when the difference is equal to or greater than the minimum value of the pressure that can drive the turbine.

2. The system of claim 1, wherein the system further comprises temperature sensors connected to the processor and respectively arranged in the boiler, the condenser, the cold side and the hot side, and the processor is configured to control the temperature of the boiler, the condenser, the cold side and the hot side to reach a safe temperature range to ensure the normal operation of the system.

3. The system of claim 1, wherein the processor is further configured to control the wind speed of the fan to adjust the flow rate of the airflow over the cooling pipe.

4. The system of claim 1, further comprising an enclosure for containing the waste heat recycling circuit.

5. The system of claim 1, wherein the system further comprises liquid level sensors connected to the processor and respectively arranged in the fluid tank, the condenser; and the boiler, the second valve arranged at the outlet of the condenser, and the third valve arranged between the fluid tank and the boiler;

the processor is configured to determine whether the level of the fluid tank is within a safe level range and control the system under the determination;

the processor is configured to determine whether the level of the condenser reaches a first set level threshold, and if the level of the condenser reaches the first set level threshold, switch the second valve to allow fluid flow out from the condenser and return to the fluid tank;

the processor is configured to determine whether the level of the boiler is lower than a second set level threshold, and if the level of the boiler is lower than the second set level threshold, switch the third valve to allow fluid flow out from the fluid tank and flow into the boiler.

6. The system of claim 5, wherein the system further comprises a pump arranged between the fluid tank and the boiler, and the processor is connected to a control end of the pump and configured to switch the pump to pump fluid from the fluid tank into the boiler when the third valve is switched.

7. The system of claim 1, wherein the waste heat recycling circuit further comprises an energy storage connected to the current output end of the generator for storing electric energy generated by the generator.

8. The system of claim 7, wherein the waste heat recycling circuit further comprises a power regulator arranged between the current output end of the generator and the energy storage for regulating the power of the current output to the energy storage; and the power regulator is also configured to connect with an external power supply and regulate the power of the current output to the system.

\* \* \* \* \*